(12) United States Patent
Krey et al.

(10) Patent No.: US 11,731,753 B2
(45) Date of Patent: Aug. 22, 2023

(54) WING FOR AN AIRCRAFT

(71) Applicant: Airbus Operations GmbH, Hamburg (DE)

(72) Inventors: Dennis Krey, Hamburg (DE);
 Alexander Huber, Hamburg (DE);
 Bernhard Schlipf, Hamburg (DE);
 Florian Lorenz, Hamburg (DE); Dustin Shapi, Hamburg (DE); Robert Grahs, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 178 days.

(21) Appl. No.: 17/208,595

(22) Filed: Mar. 22, 2021

(65) Prior Publication Data
US 2021/0300523 A1 Sep. 30, 2021

(30) Foreign Application Priority Data
Mar. 24, 2020 (DE) .......................... 102020108121.9

(51) Int. Cl.
 *B64C 9/02* (2006.01)
 *B64C 9/22* (2006.01)
(52) U.S. Cl.
 CPC . *B64C 9/02* (2013.01); *B64C 9/22* (2013.01)
(58) Field of Classification Search
 CPC ............... B64C 9/02; B64C 9/22; B64C 9/24
 See application file for complete search history.

(56) References Cited

U.S. PATENT DOCUMENTS

| | | | |
|---|---|---|---|
| 11,608,156 B2 * | 3/2023 | Mino | B64C 9/02 |
| 2020/0122819 A1 | 4/2020 | Schlipf et al. | |
| 2020/0307769 A1 * | 10/2020 | Lorenz | B64C 9/02 |
| 2023/0054504 A1 * | 2/2023 | Schlipf | B64C 9/22 |

FOREIGN PATENT DOCUMENTS

| | | | | |
|---|---|---|---|---|
| EP | 4032803 A1 * | 7/2022 | ............. | B64C 13/34 |
| WO | 2018197649 A1 | 11/2018 | | |
| WO | WO-2018197649 A1 * | 11/2018 | ............. | B64C 13/28 |
| WO | 2019154698 A1 | 8/2019 | | |
| WO | WO-2019154698 A1 * | 8/2019 | ............... | B64C 3/50 |

OTHER PUBLICATIONS

German Search Report; priority document.

* cited by examiner

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

A wing for an aircraft, including a main wing, a slat, and a connection assembly movably connecting the slat to the main wing. The connection assembly includes an elongate slat track with a front end mounted to the slat and a rear end and an intermediate portion mounted to the main wing by a roller bearing, and includes a guide rail mounted to the main wing and a first roller unit mounted to the slat track rear end and engaging the guide rail. The roller bearing includes a second roller unit mounted to the main wing and engaging a slat track intermediate portion engagement surface. The slat track has an upper and lower flange and at least one web. The second roller unit is arranged in a recess between the upper and lower flanges and engages the engagement surface provided at the upper and/or lower flange.

14 Claims, 6 Drawing Sheets

WING FOR AN AIRCRAFT

CROSS-REFERENCES TO RELATED APPLICATIONS

This application claims the benefit of the German patent application No. 102020108121.9 filed on Mar. 24, 2020, the entire disclosures of which are incorporated herein by way of reference.

FIELD OF THE INVENTION

The present invention relates to a wing for an aircraft, comprising a main wing, a slat, and a connection assembly movable connecting the slat to the main wing, such that the slat is movable between a retracted position and at least one extended position. Further aspects of the invention relate to an aircraft comprising such a wing, to a method for installing such a wing, and to a connection assembly as used in such a wing.

BACKGROUND OF THE INVENTION

The connection assembly comprises an elongate slat track that extends along a track longitudinal axis between a front end and a rear end and has an intermediate portion between the front and rear ends. The front end of the slat track is preferably fixedly mounted to the slat, e.g., by two spherical bearings, both arranged with an offset in a wing profile plane across a wing span direction. The rear end and the intermediate portion of the slat track are movably mounted to the main wing by a roller bearing such that the slat track is movable along the track longitudinal axis, i.e., along a predefined path, preferably a circular path.

The roller bearing comprises a guide rail fixedly mounted to the main wing and a first roller unit mounted to the rear end of the slat track and engaging the guide rail. Preferably, the guide rail is formed, e.g., by a C-shape, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. I.e., the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Further preferably, the first roller unit has a first axis of rotation extending in parallel to a wing span direction, to a leading edge of main wing, or to a leading edge of the slat.

The roller bearing comprises a second roller unit that is fixedly mounted to the main wing and that engages an engagement surface provided at the intermediate portion of the slat track. Preferably, the second roller unit has a second axis of rotation extending in parallel to the first axis of rotation and/or in parallel to the wing span direction, to the leading edge of main wing, or to the leading edge of the slat.

Further, the slat track has a profile, i.e., a cross section across the longitudinal axis, comprising an upper flange portion, a lower flange portion and at least one web portion connecting upper and lower flange portions. Such a profile might be, e.g., a C-profile, a double-C-profile, an I-profile, an H-profile, or a H-profile. The second roller unit is arranged in a recess between upper and lower flange portions and engages the engagement surface provided at the upper flange portion and/or at the lower flange portion, preferably either the upper flange portion or the lower flange portion or both flange portions in a successive manner.

Such wings are known in the art, for example from WO 2018/197649 A1. With the known wings, the first and/or second roller units usually have to be removed for the slat track to be able to be installed on the main wing, in particular, for the second roller unit to be inserted into the recess between upper and lower flange portions.

SUMMARY OF THE INVENTION

An object of the present invention is to provide a wing that allows for a simplified installation of the slat track at the main wing.

This object is achieved in that a gap is provided between the upper flange portion and the first roller unit, in particular, a circumferential roller surface of the first roller unit, or between the upper flange portion and a yoke portion for holding the first roller unit. The yoke portion might be provided at the rear end of the slat track extending laterally, i.e., in the span direction, from the web portion. The gap is wider, i.e., larger, at least to a minimum extent, than the diameter of the second roller unit, so that the second roller unit might be passed through the gap to be inserted into the recess when the slat track is installed on the main wing, e.g., during manufacture, assembling or maintenance of the wing. The term "wider" in this connection means wide enough for the second roller unit to be passed through the gap, which might include passing under contact.

In such a way, the second roller unit can be simply passed through the gap to be inserted into the recess for installation of the slat track on the main wing, so that the second roller unit does not need to be dismounted or removed during installation of the slat track. This means, installation of the slat track on the main wing can be greatly simplified. Further, the gap being present in the upper flange portion instead of in the lower flange portion allows insertion of the second roller unit into the recess from an upper side of the slat track, which allows the dimensions of a track cut-out in the main wing skin to be minimized, which in turn is beneficial for aerodynamic reasons.

According to a preferred embodiment, the upper flange portion extends along the track longitudinal axis between a front flange end near the front end of the slat track and a rear flange end near the rear end of the slat track, wherein the gap extends between the rear flange end and the first roller unit, preferably the circumferential roller surface of the first roller unit, or between the rear flange end and the yoke portion.

In particular, it is preferred that the gap extends between the rear flange end and a point of the first roller unit, in particular of the circumferential roller surface of the first roller unit, or a point of the yoke portion, closest to the rear flange end. Preferably, the gap extends along the track longitudinal axis. In such a way it is guaranteed that the second roller unit may fit through the gap, while that gap may not be wider than absolutely necessary.

It is further preferred that the upper flange portion at the rear flange end extends in a chamfered way from a lateral end edge to an inner end edge at the web portion, i.e., where the upper flange portion joins the web portion. The gap is measured between the inner end edge and the first roller unit, in particular the circumferential roller surface of the first roller unit, or between the inner end edge and the yoke portion.

According to a preferred embodiment, the gap is between 1% and 100%, preferably between 2% and 50%, more preferred between 3% and 10%, most preferred about 5%, wider than the diameter of the second roller unit. In such a way, the gap is only as wide as necessary, i.e., wide enough to easily have the second roller unit fit through without any frictional contact, but not so wide that the upper flange portion would be essentially weakened.

According to another preferred embodiment, the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

In particular, it is preferred that the second roller unit comprises a first roller element and a second roller element. The first roller element is arranged in the first recess and the second roller element is arranged in the second recess. First and second roller elements are arranged coaxially, i.e., both rotate about the second axis of rotation, and have the same radius. By the first and second roller element, higher loads can be absorbed and a symmetric arrangement or an arrangement with two separate load paths is enabled.

It is further preferred that the gap includes a first gap part and a second gap part. The first gap part is provided between the upper flange portion at the first side of the web portion and the first roller element, preferably the circumferential roller surface of the first roller element, or between the upper flange portion at the first side of the web portion and a yoke portion for holding the first roller unit. The second gap part is provided between the upper flange portion at the second side of the web portion and the second roller element, preferably the circumferential roller surface of the second roller element, or between the upper flange portion at the second side of the web portion and a yoke portion for holding the first roller unit. In such a way, first and second roller element can be fit through the gap, so that installation is simplified even in case of the second roller unit being composed of first and second roller elements.

According to a preferred embodiment, the web portion of the slat track comprises a slot extending from the first side to the second side of the web portion and extending elongated along the track longitudinal axis. Preferably, the slot extends along the track longitudinal axis at least as long as the distance by which the slat is moved between the retracted and a fully extended position. The first roller element and the second roller element are mounted on one common shaft for common rotation. The common shaft proceeds through the slot from the first side to the second side of the web portion. Preferably, opposite ends of the common shaft are supported at the main wing. By using one common shaft to support first and second roller elements bending loads introduced in the main wing structure are minimized.

According to an alternative embodiment, the first roller element is mounted on a first shaft and the second roller element is mounted on a second shaft separate from the first shaft. Preferably, first and second shafts are independently supported at the main wing. By using separate shafts to support first and second roller elements, no slot through the slat track is required.

According to a preferred embodiment, the first roller unit comprises a single third roller element, preferably mounted to the slat track by a yoke-shaped rear end of the slat track that holds the third roller element from opposite sides. Using only a single third roller element represents a very simple design.

In an alternative embodiment, the first roller unit comprises a third roller element and a fourth roller element. Third and fourth roller elements are arranged coaxially, i.e., both rotating about the first axis of rotation, and have the same radius. Preferably, the third roller element is arranged at the first side and the fourth roller element is arranged at the second side of the web portion. In such a way, a backup roller element is provided.

According to a preferred embodiment, the slat track comprises a first track part and a second track part that are formed separate from one another. Each of the first and second track parts is formed integrally and extends along the track longitudinal axis from the rear end to the front end. The first and second track parts are mounted to one another, e.g., by bolts, and rest against one another along a contact plane spanned by the track longitudinal axis and a wing thickness direction, which might be a vertical symmetry plane, preferably along the entire longitudinal extension. By the first and second track part, two separate load paths are introduced which might be designed as redundant load paths such that when one load path fails the other load path is still capable of carrying the occurring air loads applied via the slat.

In particular, it is preferred that the third roller element is mounted to both the first track part and the second track part. In such a way, in case of failure of one of the first and second track parts, the third roller element would still be sufficiently supported by the other one of the first and second track parts, so that this track part would still be guided by the third roller element.

Alternatively, it is preferred that the third roller element is mounted to the first track part and the fourth roller element is mounted to the second track part. In such a way, in case of failure of one of the first and second track portions, the other one of the first and second track portions would still be guided by the associated one of the third and fourth rollers.

According to yet a further preferred embodiment, the connection assembly is a first connection assembly. The wing comprises a second connection assembly connecting the slat to the main wing in a position spaces apart from the first connection assembly in a wing span direction. The second connection assembly is formed as the first connection assembly, i.e., has the same features as the first connection assembly. Alternatively, the second connections assembly might also be formed different from the first connection assembly.

A further aspect of the present invention relates to an aircraft comprising a wing according to any of the afore-described embodiments. The features and advantages mentioned in connection with the wing also apply for the aircraft.

Yet a further aspect of the present invention relates to a method for installing the wing according to any of the afore-described embodiments. The method comprises the slat track being installed on the main wing in such a manner that the slat track is moved with the gap toward the second roller unit, such that the second roller unit is passed through the gap and inserted into the recess, preferably under rotation of the slat track about the span direction. In such a way, a simple way of installing the slat track on the main wing is provided, while the dimensions of the track cut-out in the main wing skin can be minimized.

According to a preferred embodiment, when the slat track and the second roller unit are moved relative to one another to pass the second roller unit through the gap and insert it into the recess, the slat track is moved with its front end upwards, preferably from a position where the front end is below the rear end, to a position where the front end is in front of and preferably on the same level of the rear end. In such a way, installation of the slat track on the main wing is further simplified, while the dimensions of the track cut-out in the main wing skin can be further minimized.

Yet a further aspect of the present invention relates to a connection assembly for a wing according to any of the afore-described embodiments, for movably connecting a slat to a main wing for an aircraft, as described above in connection with the wing. The connection assembly comprises an elongate slat track that extends along a track longitudinal axis between a front end and a rear end and has an intermediate portion between the front and rear ends. The front end of the slat track is configured to be mounted to the slat. The rear end and the intermediate portion of the slat track are configured to be mounted to the main wing by a roller bearing such that the slat track is movable along the track longitudinal axis. The roller bearing comprises a guide rail configured to be mounted to the main wing, and a first roller unit mounted to the rear end of the slat track and configured for engaging the guide rail. The roller bearing comprises a second roller unit that is configured to be mounted to the main wing and that is configured to engage an engagement surface provided at the intermediate portion of the slat track. The slat track has a profile comprising an upper flange portion, a lower flange portion and at least one web portion connecting upper and lower flange portions. The second roller unit is configured to be arranged in a recess between upper and lower flange portions and to engage the engagement surface provided at the upper flange portion and/or at the lower flange portion. A gap is provided between the upper flange portion and the first roller unit, in particular a circumferential roller surface of the first roller unit, or between the upper flange portion and a yoke portion for holding the first roller unit. The yoke portion might be provided at the rear end of the slat track extending laterally, i.e., in the span direction, from the web portion. The gap is wider, i.e., larger, at least to a minimum extent, than the diameter of the second roller unit, so that the second roller unit might be passed through the gap to be inserted into the recess when the slat track is installed on the main wing, e.g., during manufacture, assembling or maintenance of the wing. The term "wider" in this connection means wide enough for the second roller unit to be passed through the gap, which might include passing under contact. The features and advantages mentioned in connection with the wing also apply for the connection assembly that can be used in such a wing.

BRIEF DESCRIPTION OF THE DRAWINGS

Hereinafter, a preferred embodiment of the present invention is explained in more detail by means of a drawing.

DETAILED DESCRIPTION OF THE PREFERRED EMBODIMENTS

Figure 1:
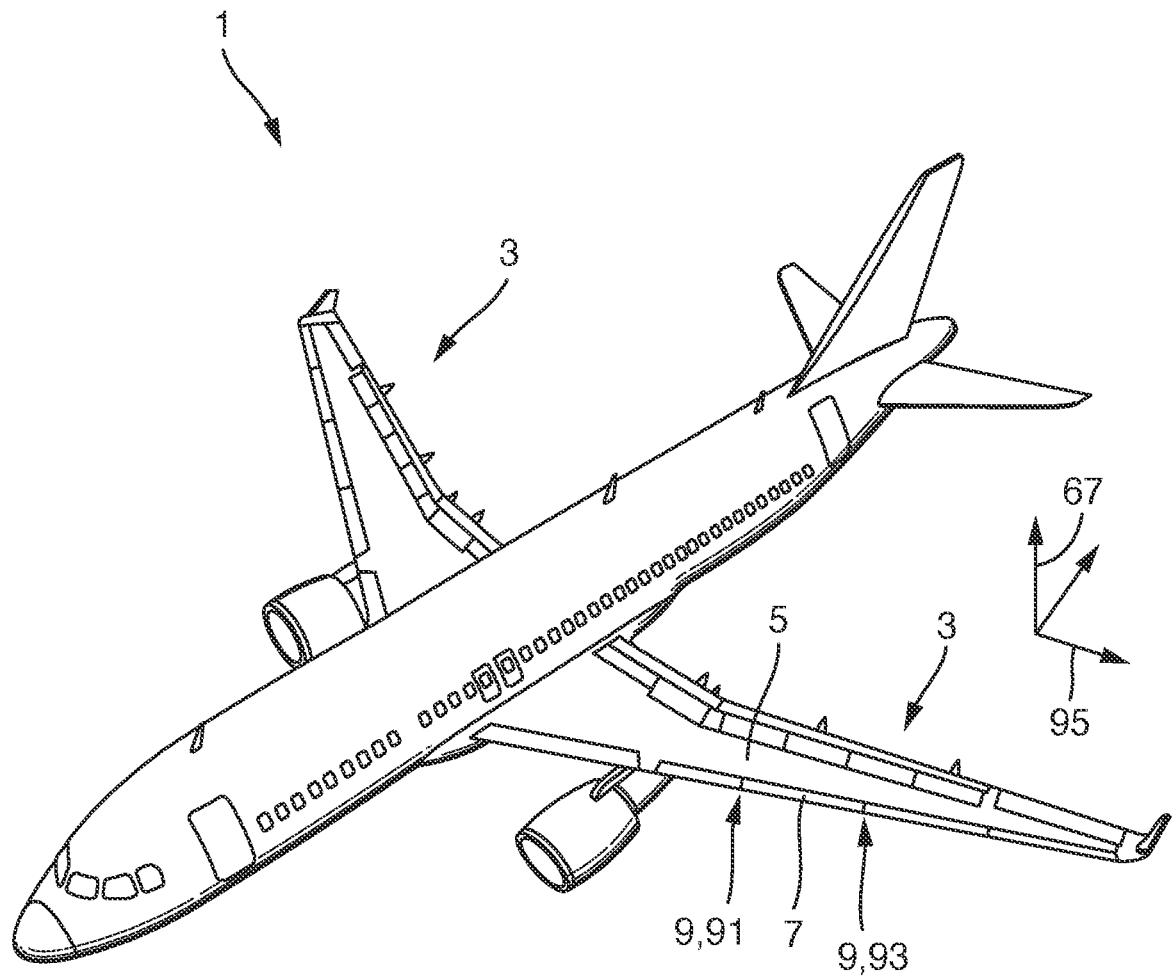
FIG. 1 is a perspective view of an aircraft according to the present invention, including a wing.

In FIG. 1 an aircraft 1 according to an embodiment of the present invention is illustrated. The aircraft 1 comprises a wing 3 that is formed according to an embodiment of the present invention.

Figure 2:
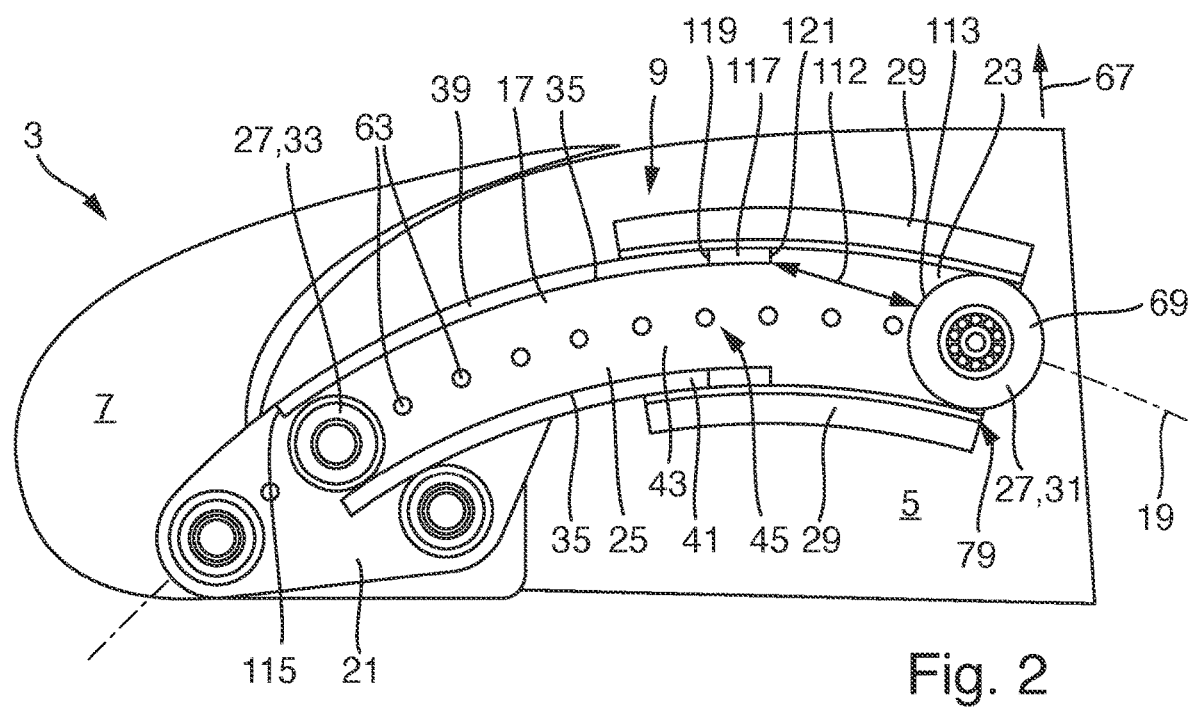
FIG. 2 is a cross sectional view of the wing shown in FIG. 1, including a connection assembly according to a first embodiment of the invention.

FIG. 2 shows the wing 1 from FIG. 1 in more detail. The wing 1 comprises a main wing 5, a slat 7, and a connection assembly 9 movable connecting the slat 7 to the main wing 5, such that the slat 7 is movable between a retracted position and at least one extended position.

Figure 3:
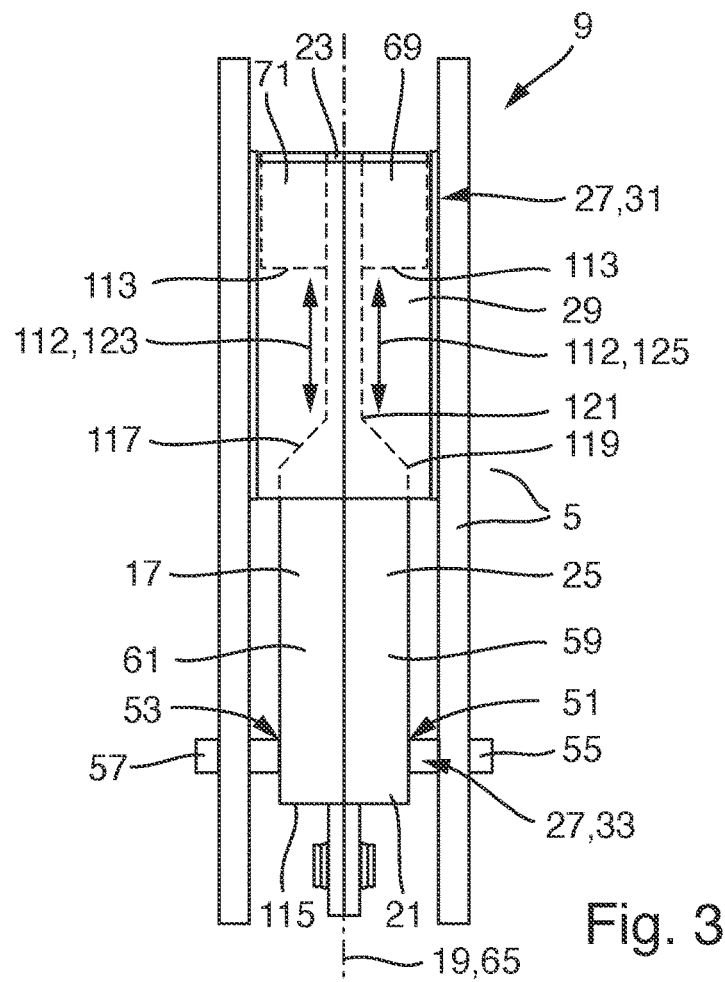
FIG. 3 is a top view of the connection assembly shown in FIG. 2.
Figure 4:
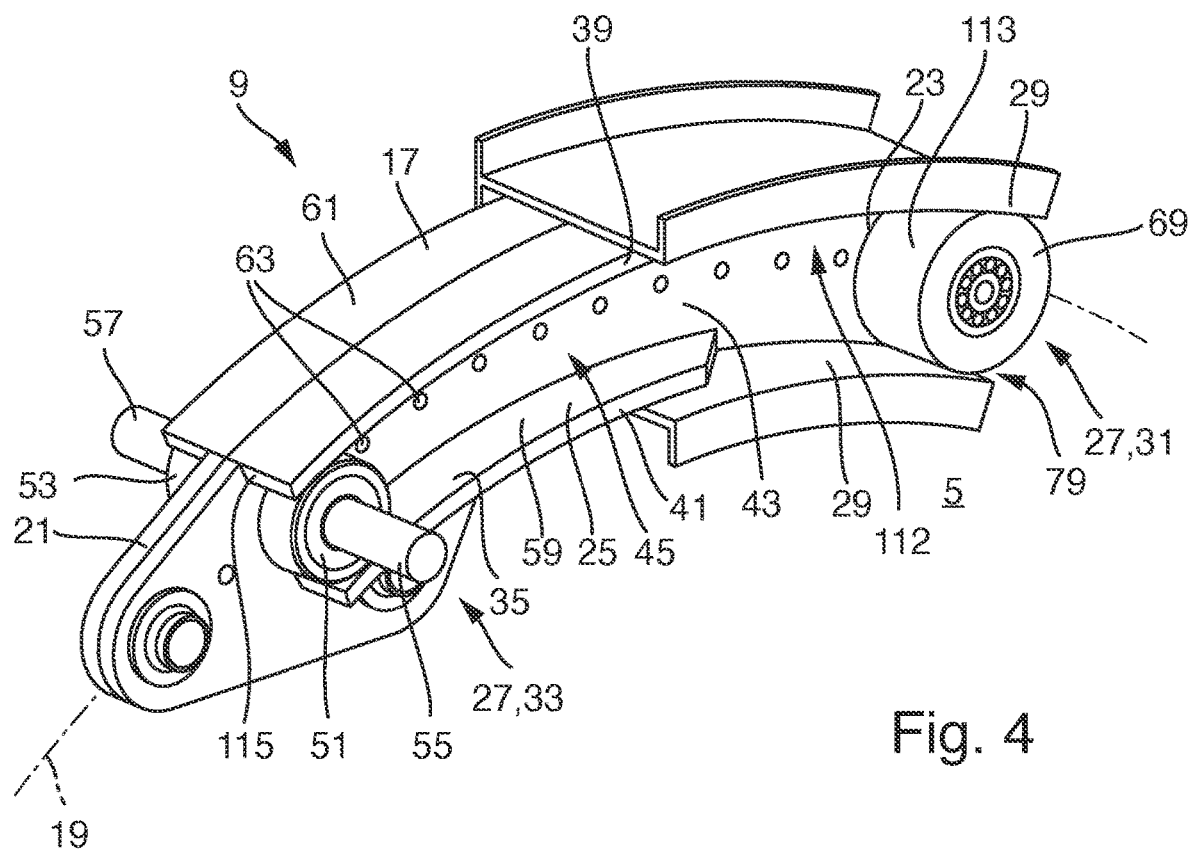
FIG. 4 is a perspective view of the connection assembly shown in FIG. 2.
Figure 5:
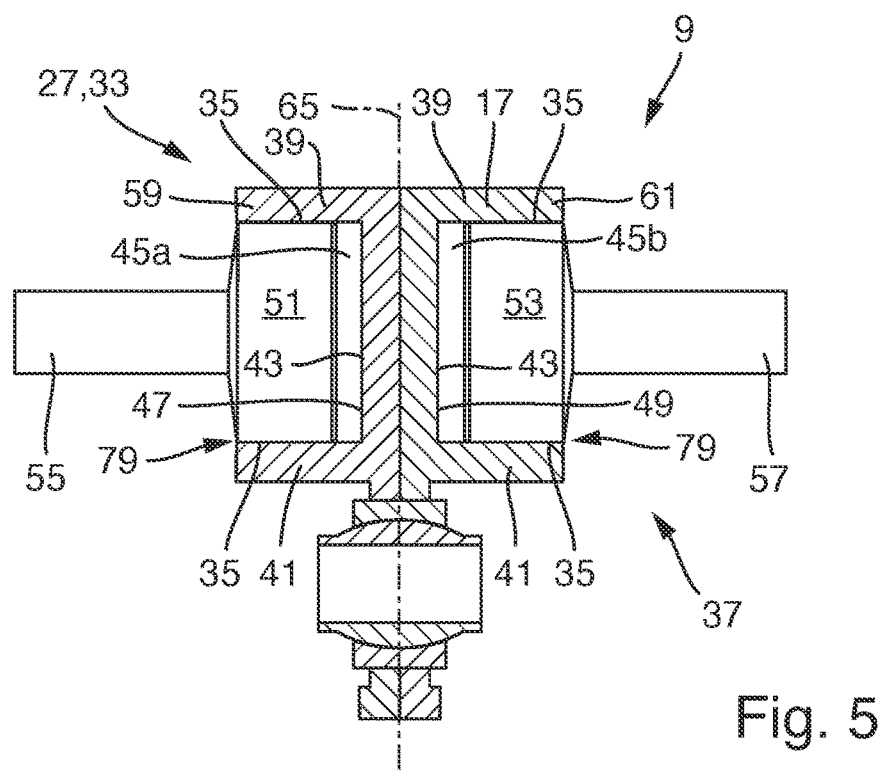
FIG. 5 is a cross sectional view across the track longitudinal axis of the connection assembly shown in FIG. 2, and FIGS. 6a-6f are stepwise illustrations of the installation process of the slat track on the main wing according to an embodiment of the invention.
Figure 6A:
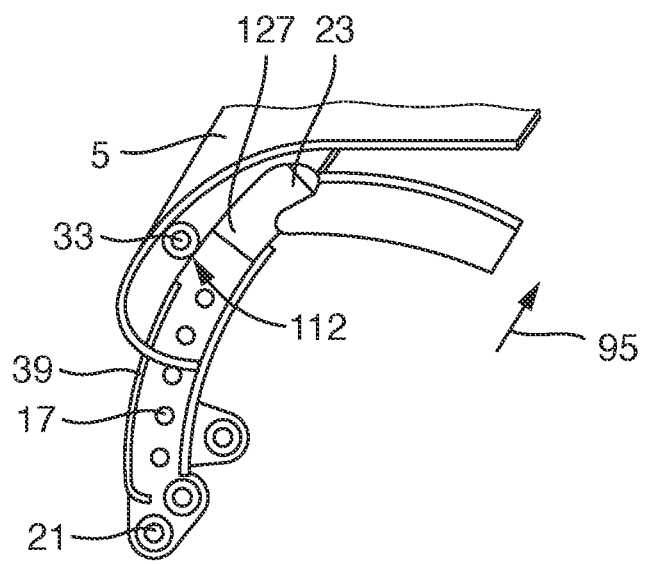
Figure 6B:
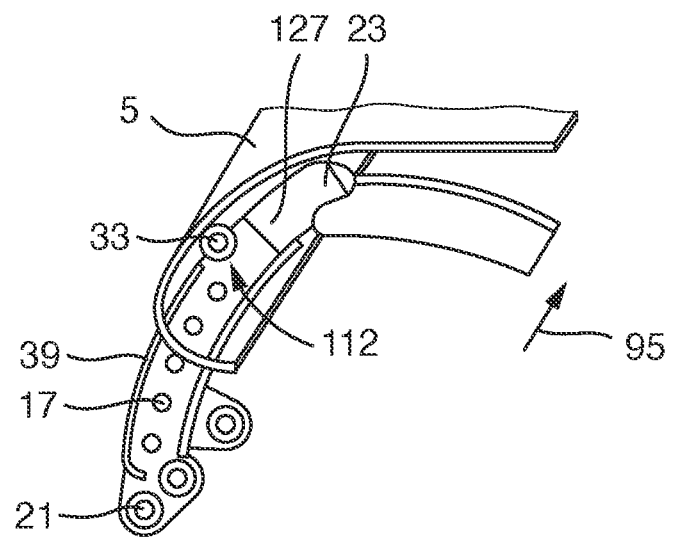
Figure 6C:
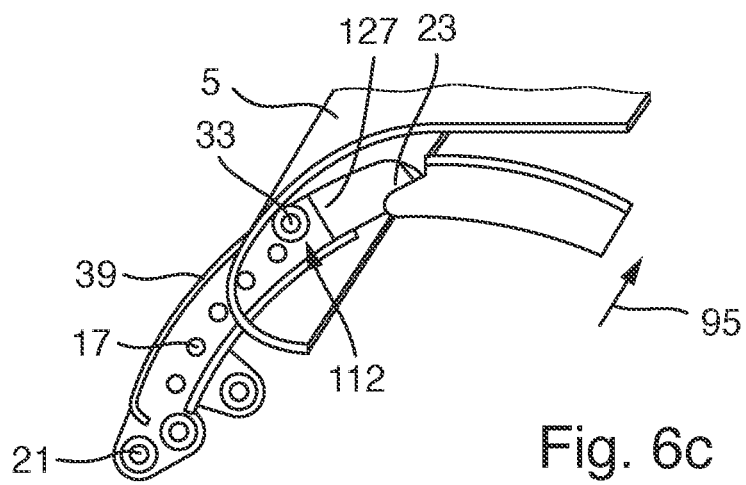
Figure 6D:
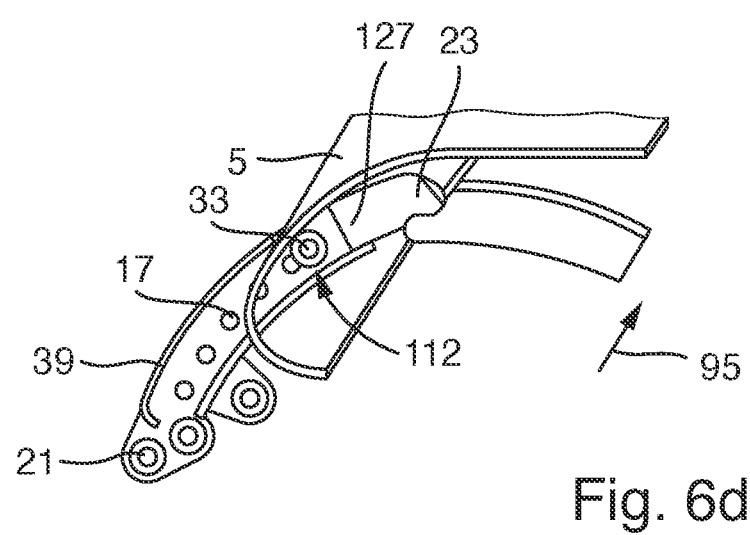
Figure 6E:
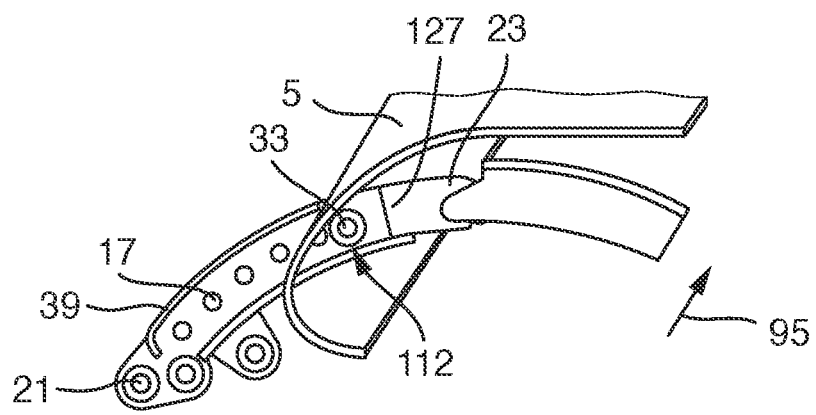
Figure 6F:
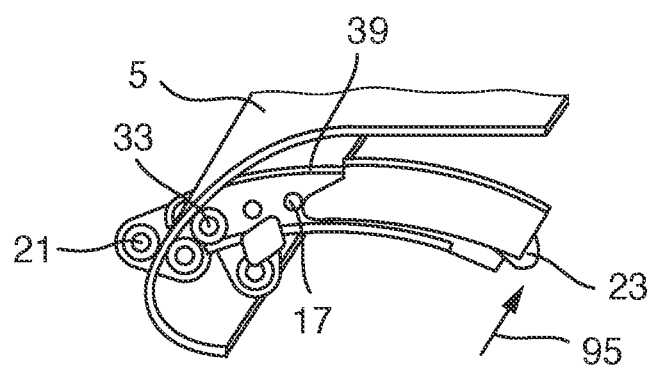

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

As shown in FIGS. 2 and 3, a gap 112 is provided between the upper flange portion 39 and a circumferential roller surface 113 of the first roller unit 31. The gap 112 is wider than the diameter of the second roller unit 33, so that the second roller unit 33 might be passed through the gap 112 to be inserted into the recess 45 when the slat track 17 is installed on the main wing 5, e.g., during manufacture, assembling or maintenance of the wing. In the present embodiment, the gap 112 is about 5%, wider than the diameter of the second roller unit 33.

The upper flange portion 39 extends along the track longitudinal axis 19 between a front flange end 115 near the front end 21 of the slat track 17 and a rear flange end 117 near the rear end 23 of the slat track 17, wherein the gap 112 extends between the rear flange end 117 and the circumferential roller surface 113 of the first roller unit 31. Precisely, the gap 112 extends between the rear flange end 117 and a point of the circumferential roller surface 113 of the first roller unit 31 closest to the rear flange end 117. The upper flange portion 39 at the rear flange end 117 extends in a chamfered way from a lateral end edge 119 to an inner end edge 121 at the web portion 43. The gap 112 is measured between the inner end edge 121 and the circumferential roller surface 113 of the first roller unit 31.

In the present embodiment as shown in FIG. 3, the gap 112 includes a first gap part 123 and a second gap part 125. The first gap part 123 is provided between the upper flange portion 39 at the first side 47 of the web portion 43 and the circumferential roller surface 113 of the first roller element 51. The second gap part 125 is provided between the upper flange portion 39 at the second side 49 of the web portion 43 and the circumferential roller surface 113 of the second roller element 53.

As shown in FIG. 1, the connection assembly 9 is a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91.

FIGS. 6a-6f, in a stepwise manner, illustrate a method for installing the wing 3 according to the described embodiment, in particular for installing the slat track 17 on the main wing 5, wherein the gap 112, instead of being provided between the upper flange portion 39 and the first roller unit 31 itself as it is the case in FIGS. 2-5, is provided between the upper flange portion 39 and a yoke portion 127 for holding the first roller unit 31. The method comprises the slat track 17 being installed on the main wing 5 in such a manner that the slat track 17 is moved with the gap 112 toward the second roller unit 33, such that the second roller unit 33 is passed through the gap 112 and inserted into the recess 45 under rotation of the slat track 17 about the wing span direction 95. When the slat track 17 and the second roller unit 33 are moved relative to one another to pass the second roller unit 33 through the gap 112 and insert it into the recess 45, the slat track 17 is moved with its front end 21 upwards from a position where the front end 21 is below the rear end 23 to a position where the front end 21 is in front of and on the same level of the rear end 23.

The described embodiment of the present invention enables the second roller unit 33 to be simply passed through the gap 112 to be inserted into the recess 45 for installation of the slat track 17 on the main wing 5, so that the second roller unit 33 does not need to be removed during installation of the slat track 17. This means, installation of the slat track 17 on the main wing 5 can be greatly simplified.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing,
a slat, and
a connection assembly movably connecting the slat to the main wing, such that the slat is movable between a retracted position and at least one extended position,
wherein the connection assembly comprises an elongate slat track that extends along a track longitudinal axis between a front end and a rear end and has an intermediate portion between the front and rear ends,
wherein the front end of the slat track is mounted to the slat,
wherein the rear end and the intermediate portion of the slat track are mounted to the main wing by a roller bearing such that the slat track is movable along the track longitudinal axis,
wherein the roller bearing comprises a guide rail mounted to the main wing and a first roller unit mounted to the rear end of the slat track and engaging the guide rail,
wherein the roller bearing comprises a second roller unit that is mounted to the main wing and that engages an engagement surface provided at the intermediate portion of the slat track,
wherein the slat track has a profile comprising an upper flange portion, a lower flange portion and at least one web portion connecting upper and lower flange portions,
wherein the second roller unit is arranged in a recess between upper and lower flange portions and engages the engagement surface provided at at least one of the upper flange portion or at the lower flange portion,
wherein a gap is provided between the upper flange portion and the first roller unit or between the upper flange portion and a yoke portion for holding the first roller unit, wherein the gap is wider than a diameter of the second roller unit, so that the second roller unit can be passed through the gap to be inserted into the recess when the slat track is installed on the main wing, and,
wherein the first roller unit or the yoke portion for holding the first roller unit is equally spaced from upper flange portion and the lower flange portion.

2. The wing according to claim 1,
wherein the upper flange portion extends along the track longitudinal axis between a front flange end and a rear flange end, and wherein the gap extends between the rear flange end and the first roller unit or the yoke portion.

3. The wing according to claim 2, wherein the gap extends between the rear flange end and a point of the first roller unit or the yoke portion, closest to the rear flange end.

4. The wing according to claim 2,
wherein the upper flange portion at the rear flange end extends in a chamfered way from a lateral end edge to an inner end edge at the web portion, and
wherein the gap is measured between the inner end edge to the first roller unit or the yoke portion.

5. The wing according to claim 1, wherein the gap is between 1% and 100% wider than the diameter of the second roller unit.

6. The wing according to claim 5, wherein the gap is between 2% and 50% wider than the diameter of the second roller unit.

7. The wing according to claim 6, wherein the gap about 5% wider than the diameter of the second roller unit.

8. The wing according to claim 1, wherein the slat track has such a profile that a first recess is formed between the upper and lower flange portions at a first side of the web portion, and a second recess is formed between the upper and lower flange portions at a second side of the web portion opposite the first side.

9. The wing according to claim 8,
wherein the second roller unit comprises a first roller element and a second roller element,
wherein the first roller element is arranged in the first recess and the second roller element is arranged in the second recess, and
wherein first and second roller elements are arranged coaxially and have the same radius.

10. The wing according to claim 9, wherein the gap includes a first gap part and a second gap part,
wherein the first gap part is provided between the upper flange portion at the first side of the web portion and the first roller element, or between the upper flange portion at the first side of the web portion and a yoke portion for holding the first roller unit, and
wherein the second gap part is provided between the upper flange portion at the second side of the web portion and the second roller element, or between the upper flange portion at the second side of the web portion and a yoke portion for holding the first roller unit.

11. An aircraft comprising a wing according to claim 1.

12. A method for installing the wing according to claim 1, wherein the slat track is installed on the main wing such that the slat track is moved with the gap toward the second roller unit, such that the second roller unit is passed through the gap and inserted into the recess.

13. The method according to claim 12, wherein when the slat track and the second roller unit are moved relative to one another to pass the second roller unit through the gap and insert the second roller unit into the recess, the slat track is moved with the front end from a position where the front end is below the rear end to a position where the front end is in front of and on the same level of the rear end.

14. A connection assembly for a wing according to claim 1, to movably connect the slat to the main wing for the aircraft, the connection assembly comprising
an elongate slat track that extends along a track longitudinal axis between a front end and a rear end and has an intermediate portion between the front and rear ends,
wherein the front end of the slat track is configured to be mounted to the slat,
wherein the rear end and the intermediate portion of the slat track are configured to be mounted to the main wing by a roller bearing such that the slat track is movable along the track longitudinal axis,
wherein the roller bearing comprises a guide rail configured to be mounted to the main wing, and a first roller unit mounted to the rear end of the slat track and configured to engage the guide rail,
wherein the roller bearing comprises a second roller unit that is configured to be mounted to the main wing and that is configured to engage an engagement surface provided at the intermediate portion of the slat track,
wherein the slat track has a profile comprising an upper flange portion, a lower flange portion and at least one web portion connecting upper and lower flange portions, and
wherein the second roller unit is arranged in a recess between upper and lower flange portions and configured to engage the engagement surface provided at at least one of the upper flange portion or at the lower flange portion,
wherein a gap is provided between the upper flange portion and the first roller unit or between the upper flange portion and a yoke portion to hold the first roller unit, wherein the gap is wider than a diameter of the second roller unit, so that the second roller unit can be passed through the gap to be inserted into the recess when the slat track is installed on the main wing.

* * * * *